(12) United States Patent
Esfahani et al.

(10) Patent No.: US 12,240,491 B2
(45) Date of Patent: Mar. 4, 2025

(54) MOTION PLANNING FOR NON-STANDARD DRIVING BEHAVIORS

(71) Applicant: GM Global Technology Operations LLC, Detroit, MI (US)

(72) Inventors: Alireza Esna Ashari Esfahani, Novi, MI (US); Upali P. Mudalige, Rochester Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 241 days.

(21) Appl. No.: 18/062,310

(22) Filed: Dec. 6, 2022

(65) Prior Publication Data

US 2024/0182063 A1 Jun. 6, 2024

(51) Int. Cl.
*B60W 60/00* (2020.01)
*B60W 30/095* (2012.01)
*B60W 30/18* (2012.01)
*B60W 50/14* (2020.01)

(52) U.S. Cl.
CPC ...... *B60W 60/001* (2020.02); *B60W 30/0956* (2013.01); *B60W 30/18163* (2013.01); *B60W 50/14* (2013.01); *B60W 2554/4046* (2020.02); *B60W 2554/80* (2020.02)

(58) Field of Classification Search
CPC .......... B60W 60/001; B60W 30/0956; B60W 30/18163; B60W 50/14; B60W 2554/4046; B60W 2554/80; B60W 60/0015; B60W 60/0017
See application file for complete search history.

(56) References Cited

U.S. PATENT DOCUMENTS

| | | | | |
|---|---|---|---|---|
| 9,507,345 | B2* | 11/2016 | Takamatsu | B60W 30/00 |
| 11,858,529 | B1* | 1/2024 | Costantino | B60W 40/02 |
| 2015/0046078 | A1* | 2/2015 | Biess | G08G 1/163 |
| | | | | 701/301 |
| 2020/0255033 | A1* | 8/2020 | Matsunaga | B60W 30/18145 |
| 2022/0258755 | A1* | 8/2022 | Kuehner | B60W 30/0956 |
| 2023/0406309 | A1* | 12/2023 | Seo | B60W 30/18163 |

OTHER PUBLICATIONS

U.S. Appl. No. 18/055,116, filed Nov. 14, 2022.

* cited by examiner

*Primary Examiner* — Kira Nguyen
(74) *Attorney, Agent, or Firm* — Vivacqua Crane, PLLC

(57) ABSTRACT

A system for motion planning for a vehicle includes at least one vehicle sensor for determining information about an environment surrounding the vehicle and a controller in electrical communication with the at least one vehicle sensor. The controller is programmed to perform a plurality of measurements of a remote vehicle using the at least one vehicle sensor. The plurality of measurements includes at least a plurality of position measurements of the remote vehicle. The controller is further programmed to determine a risk score for each of a plurality of location cells in an environment surrounding the remote vehicle based at least in part on the plurality of measurements of the remote vehicle. The controller is further programmed to adjust a planned path of the vehicle based at least in part on the risk score of each of the plurality of location cells in the environment surrounding the remote vehicle.

15 Claims, 8 Drawing Sheets

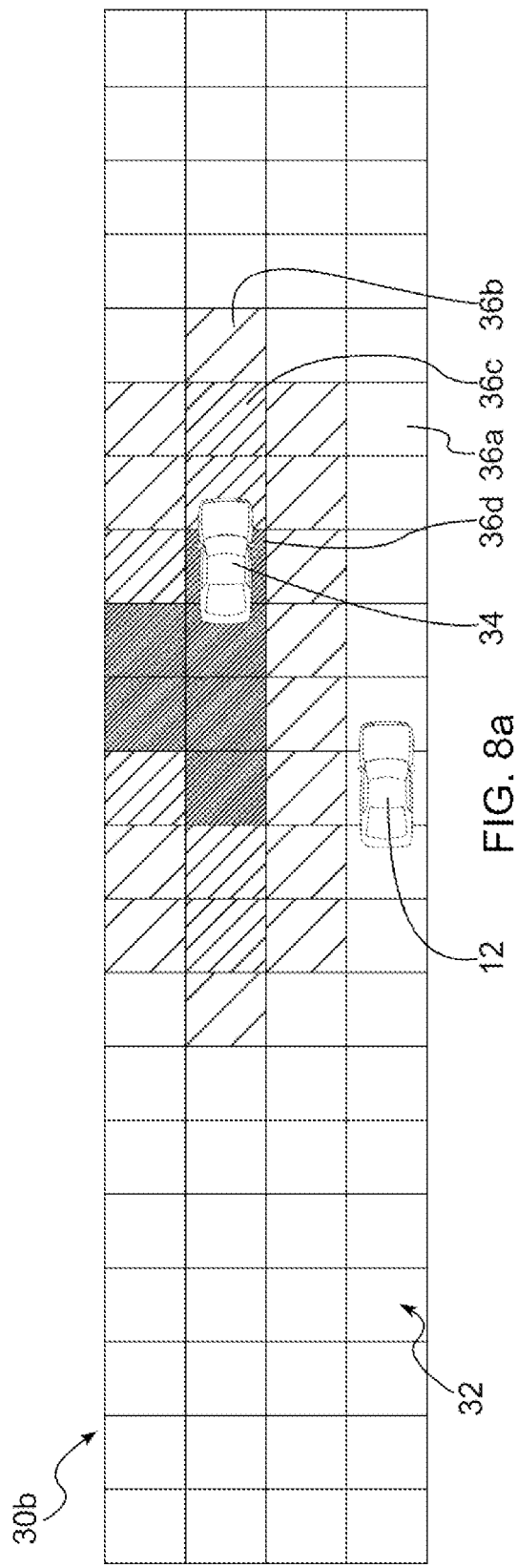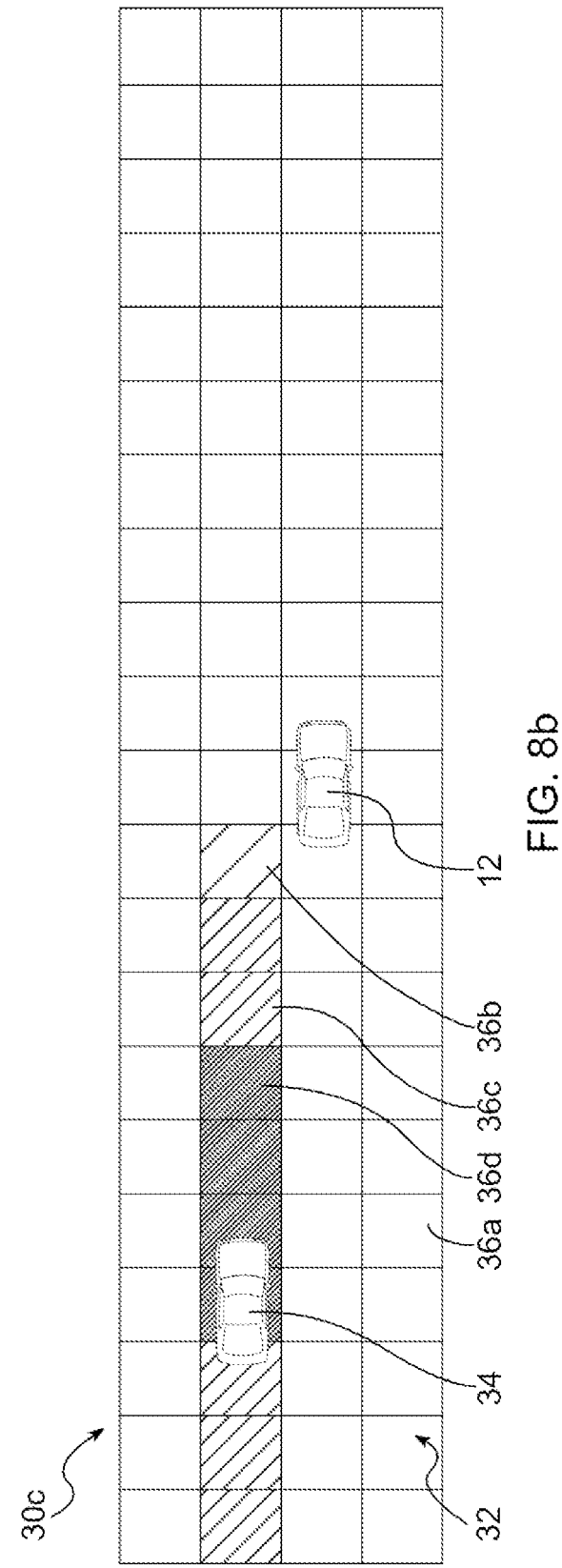

MOTION PLANNING FOR NON-STANDARD DRIVING BEHAVIORS

INTRODUCTION

The present disclosure relates to autonomous vehicles and, more particularly, to systems and methods for motion planning for a vehicle.

In autonomous vehicles, motion planning systems are generally designed to determine an optimal path for a vehicle to traverse a given environment while avoiding obstacles and obeying traffic laws. Motion planning systems may use sensors to gather data about objects (e.g., a remote vehicle, pedestrian, and/or structure) in the environment surrounding the vehicle. Using the data gathered about the objects in the environment and data about the vehicle (e.g., speed, acceleration, and/or steering angle), the motion planning system determines an optimal path for the vehicle. However, motion planning systems may fail to account for collision risk caused by unexpected driver actions, erratic driving behaviors, and/or damaged vehicle components.

Thus, while motion planning systems achieve their intended purpose, there is a need for a new and improved system and method for motion planning for a vehicle that accounts for unexpected driver actions, erratic driving behaviors, and/or damaged vehicle components.

SUMMARY

According to several aspects, a system for motion planning for a vehicle is provided. The system includes at least one vehicle sensor for determining information about an environment surrounding the vehicle and a controller in electrical communication with the at least one vehicle sensor. The controller is programmed to perform a plurality of measurements of a remote vehicle using the at least one vehicle sensor. The plurality of measurements includes at least a plurality of position measurements of the remote vehicle relative to the vehicle. The controller is further programmed to determine a risk score for each of a plurality of location cells in an environment surrounding the remote vehicle based at least in part on the plurality of measurements of the remote vehicle. The controller is further programmed to adjust a planned path of the vehicle based at least in part on the risk score of each of the plurality of location cells in the environment surrounding the remote vehicle.

In another aspect of the present disclosure, to determine the risk score for each of the plurality of location cells in the environment surrounding the remote vehicle, the controller is further programmed to determine the risk score for each of the plurality of location cells using a risk score machine learning model. An input for the risk score machine learning model includes the plurality of measurements of the remote vehicle. An output of the risk score machine learning model is the risk score for each of the plurality of location cells.

In another aspect of the present disclosure, to adjust the planned path of the vehicle, the controller is further programmed to determine a behavior class of the remote vehicle based at least in part on the plurality of measurements of the remote vehicle. The behavior class includes an intentional behavior class and an unintentional behavior class. To adjust the planned path of the vehicle, the controller is further programmed to adjust the planned path of the vehicle using a path determination algorithm based at least in part on the behavior class.

In another aspect of the present disclosure, to adjust the planned path of the vehicle, the controller is further programmed to determine a behavior type of the remote vehicle in response to determining that the behavior class of the remote vehicle is the intentional behavior class. The behavior type includes at least one of a tailgating behavior type, a road rage behavior type, and a wrong direction behavior type. To adjust the planned path of the vehicle, the controller is further programmed to execute a tailgating supervisory action to adjust the planned path of the vehicle in response to determining that the behavior type of the remote vehicle is the tailgating behavior type. To adjust the planned path of the vehicle, the controller is further programmed to execute a road rage supervisory action to adjust the planned path of the vehicle in response to determining that the behavior type of the remote vehicle is the road rage behavior type. To adjust the planned path of the vehicle, the controller is further programmed to execute a wrong direction supervisory action to adjust the planned path of the vehicle in response to determining that the behavior type of the remote vehicle is the wrong direction behavior type.

In another aspect of the present disclosure, to execute the tailgating supervisory action, the controller is further programmed to determine a maximum allowed speed based at least in part on a speed limit of a roadway upon which the vehicle is traveling and compare a speed of the vehicle to the maximum allowed speed. To execute the tailgating supervisory action, the controller is further programmed to increase the speed of the vehicle in response to determining that the speed of the vehicle is less than the maximum allowed speed. To execute the tailgating supervisory action, the controller is further programmed to maintain the speed of the vehicle in response to determining that the speed of the vehicle is greater than or equal to the maximum allowed speed. To execute the tailgating supervisory action, the controller is further programmed to identify a state of a right adjacent lane of travel. The state of the right adjacent lane of travel includes an occupied state and an unoccupied state. To execute the tailgating supervisory action, the controller is further programmed to move the vehicle into the right adjacent lane of travel in response to determining that the state of the right adjacent lane of travel is the unoccupied state. To execute the tailgating supervisory action, the controller is further programmed to identify a state of a left adjacent lane of travel. The state of the left adjacent lane of travel includes an occupied state and an unoccupied state. To execute the tailgating supervisory action, the controller is further programmed to move the vehicle into the left adjacent lane of travel in response to determining that the state of the left adjacent lane of travel is the unoccupied state. To execute the tailgating supervisory action, the controller is further programmed to determine a chase time in response to determining that the state of the right adjacent lane of travel is the occupied state and the state of the left adjacent lane of travel is the occupied state. To execute the tailgating supervisory action, the controller is further programmed to compare the chase time to a predetermined chase time threshold. To execute the tailgating supervisory action, the controller is further programmed to notify an occupant of the vehicle and move the vehicle into a shoulder of the roadway in response to determining that the chase time is greater than or equal to the predetermined chase time threshold. To execute the tailgating supervisory action, the controller is further programmed to transmit information to a remote vehicle using a vehicle communication system in response to determining that the chase time is greater than or equal to the predetermined chase time threshold.

In another aspect of the present disclosure, to execute the road rage supervisory action, the controller is further programmed to notify an occupant of the vehicle. To execute the road rage supervisory action, the controller is further programmed to determine a lane state of the remote vehicle. The lane state includes a same lane state and an adjacent lane state. To execute the road rage supervisory action, the controller is further programmed to move the vehicle into an adjacent lane in response to determining that the lane state of the remote vehicle is the same lane state. To execute the road rage supervisory action, the controller is further programmed to decrease a speed of the vehicle in response to determining that the lane state of the remote vehicle is the adjacent lane state. To execute the road rage supervisory action, the controller is further programmed to identify a relative location of the vehicle to the remote vehicle. The relative location of the vehicle includes a leading relative location and a following relative location. To execute the road rage supervisory action, the controller is further programmed to take a first evasive action in response to determining that the relative location of the vehicle is the leading relative location. To execute the road rage supervisory action, the controller is further programmed to take a second evasive action in response to determining that an occupant of the remote vehicle has exited the remote vehicle.

In another aspect of the present disclosure, to execute the wrong direction supervisory action, the controller is further programmed to detect the remote vehicle using a vehicle communication system. To execute the wrong direction supervisory action, the controller is further programmed to adjust the planned path of the vehicle to exit a roadway upon which the remote vehicle is traveling in response to detecting the remote vehicle using the vehicle communication system. To execute the wrong direction supervisory action, the controller is further programmed to detect the remote vehicle using the at least one vehicle sensor. To execute the wrong direction supervisory action, the controller is further programmed to identify a predicted path of the remote vehicle in response to detecting the remote vehicle using the at least one vehicle sensor. The predicted path includes a collision path and a non-collision path. To execute the wrong direction supervisory action, the controller is further programmed to move the vehicle to a shoulder of a roadway upon which the vehicle is traveling in response to determining that the predicted path of the remote vehicle is the collision path. To execute the wrong direction supervisory action, the controller is further programmed to take a third evasive action in response to determining that the predicted path of the remote vehicle is the non-collision path.

In another aspect of the present disclosure, the path determination algorithm is configured to adjust the planned path of the vehicle to minimize the risk score of each of the plurality of location cells entered by the vehicle and maximize a distance between the vehicle and the remote vehicle.

In another aspect of the present disclosure, the path determination algorithm is a reinforcement learning algorithm. The reinforcement learning algorithm is trained based at least in part on a distance between the vehicle and the remote vehicle.

In another aspect of the present disclosure, the reinforcement learning algorithm is trained using a simulated environment. The simulated environment includes a simulated host vehicle and a simulated remote vehicle. The simulated environment further includes a plurality of simulated location cells. Each of the plurality of simulated location cells having a simulated risk score. The reinforcement learning algorithm receives a first reward proportional to the distance between the simulated host vehicle and the simulated remote vehicle and second reward proportional to the simulated risk score of each of the plurality of simulated location cells entered by the simulated host vehicle. The reinforcement learning algorithm is configured to maximize a total reward.

According to several aspects, a method for motion planning for a vehicle is provided. The method includes performing a plurality of measurements of a remote vehicle using at least one vehicle sensor. The plurality of measurements includes at least a plurality of position measurements of the remote vehicle. The method also includes determining a risk score for each of a plurality of location cells in an environment surrounding the remote vehicle based at least in part on the plurality of measurements of the remote vehicle. The method also includes adjusting a planned path of the vehicle based at least in part on the risk score of each of the plurality of location cells in the environment surrounding the remote vehicle.

In another aspect of the present disclosure, determining the risk score for each of the plurality of location cells in the environment surrounding the remote vehicle further may include determining the risk score for each of the plurality of location cells using a risk score machine learning model. An input for the risk score machine learning model includes the plurality of measurements of the remote vehicle. An output of the risk score machine learning model is the risk score for each of the plurality of location cells.

In another aspect of the present disclosure, adjusting a planned path of the vehicle further may include determining a behavior class of the remote vehicle based at least in part on the plurality of measurements of the remote vehicle. The behavior class includes an intentional behavior class and an unintentional behavior class. Adjusting a planned path of the vehicle further may include adjusting the planned path of the vehicle using a path determination algorithm based at least in part on the behavior class of the remote vehicle.

In another aspect of the present disclosure, adjusting a planned path of the vehicle further may include determining a behavior type of the remote vehicle in response to determining that the behavior class of the remote vehicle is the intentional behavior class. The behavior type includes a tailgating behavior type, a road rage behavior type, and a wrong direction behavior type. Adjusting a planned path of the vehicle further may include executing a tailgating supervisory action to adjust the planned path of the vehicle in response to determining that the behavior type of the remote vehicle is the tailgating behavior type. Adjusting a planned path of the vehicle further may include executing a road rage supervisory action to adjust the planned path of the vehicle in response to determining that the behavior type of the remote vehicle is the road rage behavior type. Adjusting a planned path of the vehicle further may include executing a wrong direction supervisory action to adjust the planned path of the vehicle in response to determining that the behavior type of the remote vehicle is the wrong direction behavior type.

In another aspect of the present disclosure, the path determination algorithm is a reinforcement learning algorithm. The method further includes training the reinforcement learning algorithm. Training the reinforcement learning algorithm further may include training the reinforcement learning algorithm to adjust the planned path of the vehicle to minimize the risk score of each of the plurality of location cells entered by the vehicle and maximize a distance between the vehicle and the remote vehicle.

In another aspect of the present disclosure, the reinforcement learning algorithm receives rewards based at least in part on a distance between the vehicle and the remote vehicle.

In another aspect of the present disclosure, training the reinforcement learning algorithm further may include generating a plurality of simulated environments. Each of the plurality of simulated environments includes a simulated host vehicle, a simulated remote vehicle, and a plurality of simulated location cells. Training the reinforcement learning algorithm further may include determining a simulated risk score for each of the plurality of simulated location cells of each of the plurality of simulated environments. Training the reinforcement learning algorithm further may include training the reinforcement learning algorithm using the plurality of simulated environments. The reinforcement learning algorithm receives a first reward proportional to the distance between the simulated host vehicle and the simulated remote vehicle and a second reward proportional to the simulated risk score of each of the plurality of simulated location cells entered by the simulated host vehicle. The reinforcement learning algorithm is configured to maximize a total reward.

According to several aspects, a system for motion planning for a vehicle is provided. The system includes at least one vehicle sensor for determining information about an environment surrounding the vehicle. The system also includes a global navigation satellite system (GNSS) for determining a geographical location, heading, and orientation of the vehicle. The system also includes a controller in electrical communication with the at least one vehicle sensor and the GNSS. The controller is programmed to perform a plurality of measurements of a remote vehicle using the at least one vehicle sensor. The plurality of measurements includes at least a plurality of position measurements of the remote vehicle. The controller is further programmed to determine a risk score for each of a plurality of location cells in an environment surrounding the vehicle using a risk score machine learning model. An input for the risk score machine learning model includes the plurality of measurements of the remote vehicle. An output of the risk score machine learning model is the risk score for each of the plurality of location cells. The controller is further programmed to determine a behavior class of the remote vehicle based at least in part on the plurality of measurements of the remote vehicle. The behavior class includes an intentional behavior class and an unintentional behavior class. The controller is further programmed to adjust a planned path of the vehicle using a path determination algorithm in response to determining that the behavior class is the unintentional behavior class.

In another aspect of the present disclosure, to adjust the planned path of the vehicle, the controller is further programmed to determine a behavior type of the remote vehicle in response to determining that the behavior class of the remote vehicle is the intentional behavior class. The behavior type includes a tailgating behavior type, a road rage behavior type, and a wrong direction behavior type. To adjust the planned path of the vehicle, the controller is further programmed to execute a tailgating supervisory action to adjust the planned path of the vehicle in response to determining that the behavior type of the remote vehicle is the tailgating behavior type. To adjust the planned path of the vehicle, the controller is further programmed to execute a road rage supervisory action to adjust the planned path of the vehicle in response to determining that the behavior type of the remote vehicle is the road rage behavior type. To adjust the planned path of the vehicle, the controller is further programmed to execute a wrong direction supervisory action to adjust the planned path of the vehicle in response to determining that the behavior type of the remote vehicle is the wrong direction behavior type.

In another aspect of the present disclosure, the path determination algorithm is a reinforcement learning algorithm trained using a simulated environment. The simulated environment includes a simulated host vehicle and a simulated remote vehicle. The simulated environment further includes a plurality of simulated location cells, each of the plurality of simulated location cells having a simulated risk score. The reinforcement learning algorithm receives a first reward proportional to a distance between the simulated host vehicle and the simulated remote vehicle and a second reward proportional to the simulated risk score of each of the plurality of simulated location cells entered by the simulated host vehicle. The reinforcement learning algorithm is configured to maximize a total reward.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 8a is a schematic diagram of a second exemplary driving environment according to an exemplary embodiment; and FIG. 8b is a schematic diagram of a third exemplary driving environment according to an exemplary embodiment.

DETAILED DESCRIPTION

The following description is merely exemplary in nature and is not intended to limit the present disclosure, application, or uses.

To choose a path for an autonomous or semi-autonomous vehicle and/or to supplement advanced driver-assistance systems (ADAS) of a vehicle, the present disclosure provides a vehicle equipped with a motion planning system. The motion planning system accounts for a variety of environmental factors to choose an optimal path, for example, road geometry (e.g., lane width, intersection configuration, and the like), traffic laws, and position of other vehicles on the roadway. Advantageously, the motion planning system of the present disclosure further accounts for other vehicles on the roadway that exhibit hazardous and/or unpredictable behavior due to, for example, negligence, distraction, or emotional reactions (e.g., "road rage").

Figure 1:
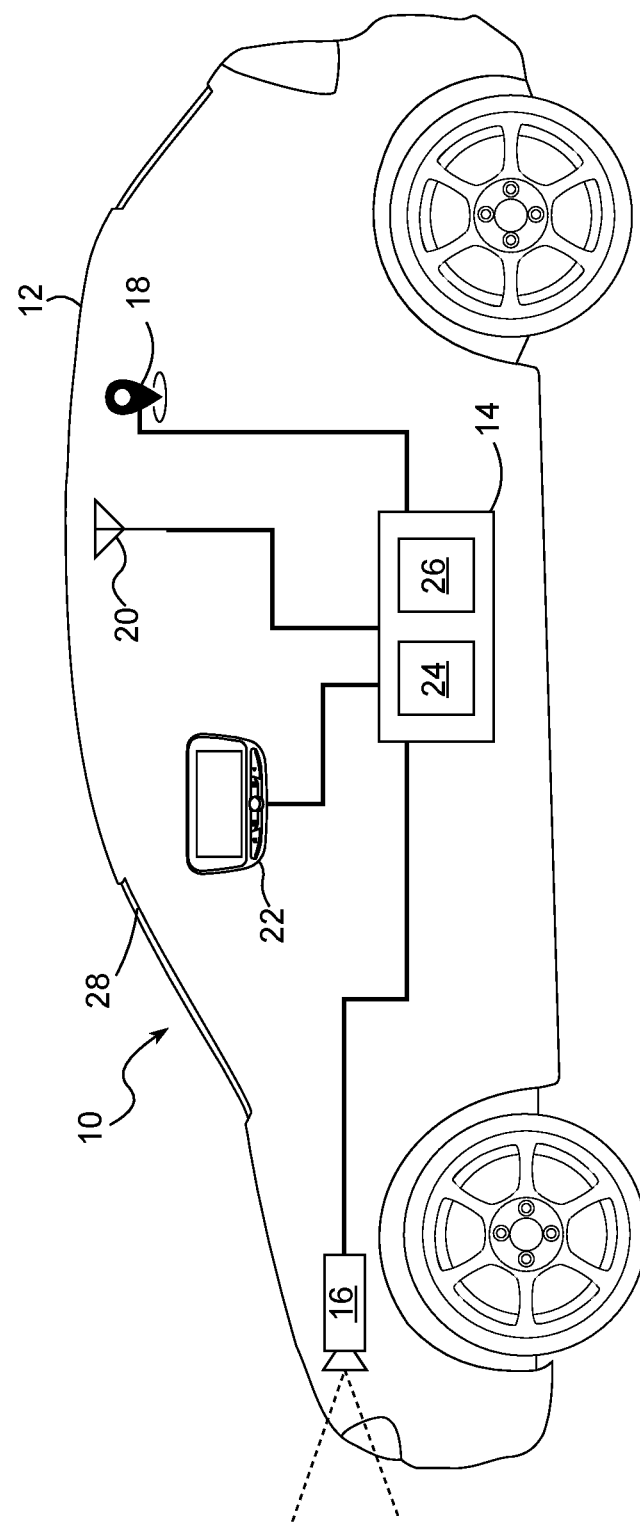
FIG. 1 is a schematic diagram of a system for motion planning for a vehicle according to an exemplary embodiment.

Referring to FIG. 1, a system for motion planning for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, at least one vehicle sensor 16, a global navigation satellite system (GNSS) 18, a vehicle communication system 20, and a display 22.

The controller 14 is used to implement a method 100 for motion planning for a vehicle, as will be described below. The controller 14 includes at least one processor 24 and a non-transitory computer readable storage device or media 26. The processor 24 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 26 may include volatile and nonvolatile storage in read-only memory (ROM), random-access memory (RAM), and keep-alive memory (KAM), for example. KAM is a persistent or non-volatile memory that may be used to store various operating variables while the processor 24 is powered down. The computer-readable storage device or media 26 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the at least one vehicle sensor 16, the global navigation satellite system (GNSS) 18, the vehicle communication system 20, and the display 22. In an exemplary embodiment, the electrical communication is established using, for example, a CAN bus, a Wi-Fi network, a cellular data network, or the like. It should be understood that various additional wired and wireless techniques and communication protocols for communicating with the controller 14 are within the scope of the present disclosure.

The at least one vehicle sensor 16 is used to gather information about an environment surrounding the vehicle 12, including, for example, distance measurements between the vehicle 12 and a remote vehicle and/or capture images and/or videos of the environment surrounding the vehicle 12. In an exemplary embodiment, the at least one vehicle sensor 16 is a photo and/or video camera which is positioned to view the environment in front of the vehicle 12. In one example, the at least one vehicle sensor 16 is affixed inside of the vehicle 12, for example, in a headliner of the vehicle 12, having a view through a windscreen 28 of the vehicle 12. In another example, the at least one vehicle sensor 16 is affixed outside of the vehicle 12, for example, on a roof of the vehicle 12, having a view of the environment in front of the vehicle 12. It should be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure. Additionally, it should be understood that use of additional types of sensors, such as, for example, LIDAR, radar, ultrasonic distance measuring, an inertial measurement unit, and the like are within the scope of the present disclosure.

The GNSS 18 is used to determine a geographical location of the vehicle 12 on a map. In an exemplary embodiment, the GNSS 18 includes a GNSS receiver antenna (not shown) and a GNSS controller (not shown) in electrical communication with the GNSS receiver antenna. The GNSS receiver antenna receives signals from a plurality of satellites, and the GNSS controller calculates the geographical location of the vehicle 12 based on the signals received by the GNSS receiver antenna. In an exemplary embodiment, the GNSS 18 additionally includes a map. The map includes information about infrastructure such as municipality borders, roadways, railways, sidewalks, buildings, and the like. Therefore, the geographical location of the vehicle 12 is contextualized using the map information. The map further includes information, such as, for example, road type, road width, road markings (e.g., lane edges), road signage (e.g., road signs and traffic signals), road speed limit, road weather condition, and road lighting condition. In a non-limiting example, the map is retrieved from a remote source using a wireless connection. In another non-limiting example, the map is stored in a database of the GNSS 18.

The vehicle communication system 20 is used by the controller 14 to communicate with other systems external to the vehicle 12. For example, the vehicle communication system 20 includes capabilities for communication with vehicles ("V2V" communication), infrastructure ("V2I" communication), remote systems at a remote call center (e.g., ON-STAR by GENERAL MOTORS) and/or personal devices. In the scope of the present disclosure, the term "V2X" refers to communication between the vehicle 12 and any remote system (e.g., vehicles, infrastructure, and/or remote systems). In certain embodiments, the vehicle communication system 20 is a wireless communication system configured to communicate via a wireless local area network (WLAN) using IEEE 802.11 standards or by using cellular data communication. However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 20 may include one or more antennas and/or communication transceivers for receiving and/or transmitting signals, such as cooperative sensing messages (CSMs). The vehicle communication system 20 is configured to wirelessly communicate information between the vehicle 12 and another vehicle. Further, the vehicle communication system 20 is configured to wirelessly communicate information between the vehicle 12 and infrastructure or other vehicles.

The display 22 is used to provide information to an occupant of the vehicle 12. In the scope of the present disclosure, the occupant includes a driver and/or a passenger of the vehicle 12. In the exemplary embodiment depicted in FIG. 1, the display 22 is a human-machine interface (HMI) located in view of the occupant and capable of displaying text, graphics and/or images. It is to be understood that HMI display systems including LCD displays, LED displays, and the like are within the scope of the present disclosure. Further exemplary embodiments where the display 22 is disposed in a rearview mirror are also within the scope of the present disclosure. In another exemplary embodiment, the display 22 includes a head-up display (HUD) configured to provide information to the occupant by projecting text, graphics, and/or images upon the windscreen 28. The text, graphics, and/or images are reflected by the windscreen 28 and are visible to the occupant without looking away from a roadway ahead of the vehicle 12. In another exemplary embodiment, the display 22 includes an augmented reality head-up display (AR-HUD). The AR-HUD is a type of HUD configured to augment the occupant's vision of the roadway ahead of the vehicle 12 by overlaying text, graphics, and/or images on physical objects in the environment surrounding the vehicle 12 within a field-of-view of the occupant. It should be understood that additional systems for displaying information to the occupant of the vehicle 12 are also within the scope of the present disclosure.

Figure 2:
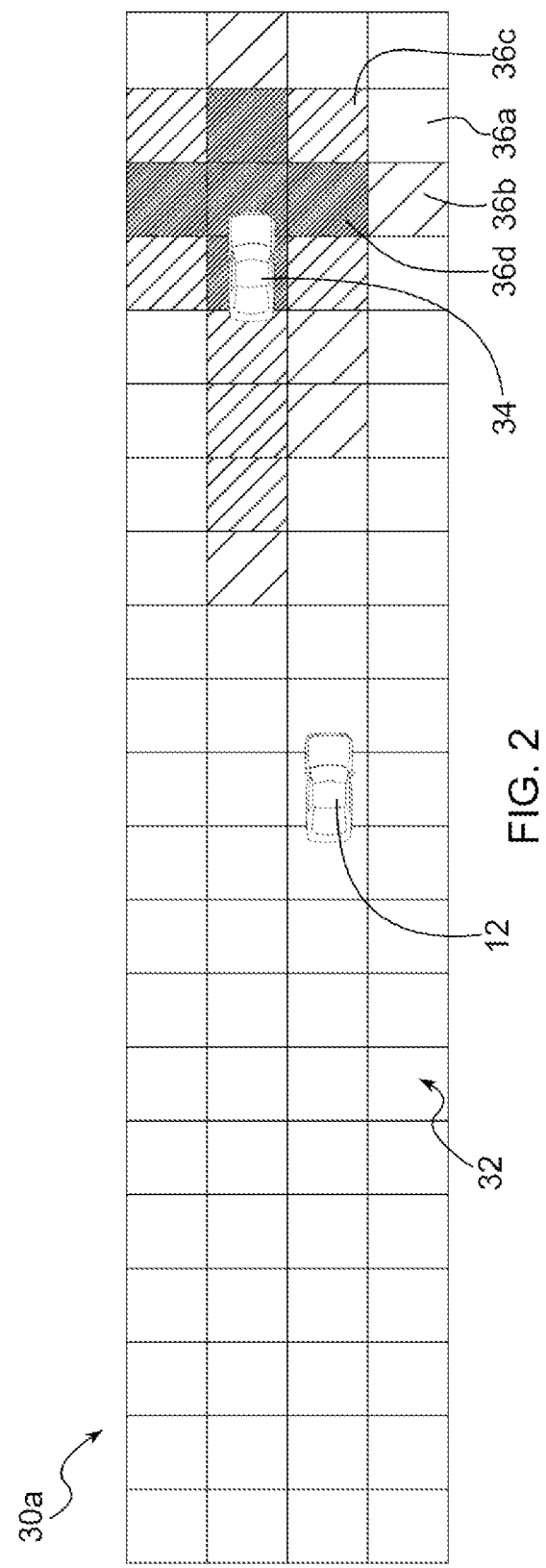
FIG. 2 is a schematic diagram of a first exemplary driving environment according to an exemplary embodiment.

Referring to FIG. 2, a first exemplary driving environment 30a is represented as a plurality of location cells 32. In a non-limiting example, the first exemplary driving environment 30a includes a roadway having a plurality of lanes of travel. The first exemplary driving environment 30a includes the vehicle 12 and a remote vehicle 34. Each of the plurality of location cells 32 is assigned a risk score. In the scope of the present disclosure, the risk score of one of the plurality of location cells 32 quantifies a level of risk for the vehicle 12 to enter the one of the plurality of location cells 32. The risk score will be discussed in further detail below. In FIG. 2 and throughout the present disclosure, the risk score of each of the plurality of location cells 32 is represented by varying density of hatch fill. More specifically, location cells having a low risk score (e.g., between zero and twenty) are depicted with no hatch fill (e.g., location cell 36a). Location cells having a moderate risk score (e.g., between twenty and forty) are depicted with a moderate-density hatch fill (e.g., location cell 36b). Location cells having a high risk score (e.g., between forty and sixty) are depicted with a high-density hatch fill (e.g., location cell 36c). Location cells having a very high risk score (e.g., between sixty and one hundred) are depicted with a very-high-density hatch fill (e.g., location cell 36d). It should be understood that each of the plurality of location cells 32 are assigned risk scores continuously within a predetermined range (e.g., between zero and one hundred). The depiction of location cells having a low, moderate, high, and very high risk score is for illustrative purposes only and is not intended to limit the present disclosure. The first exemplary driving environment 30a depicts an exemplary situation where the remote vehicle 34 is increasing speed and changing lanes erratically. Further exemplary driving environments will be discussed below in reference to FIGS. 8a and 8b.

Figure 3:
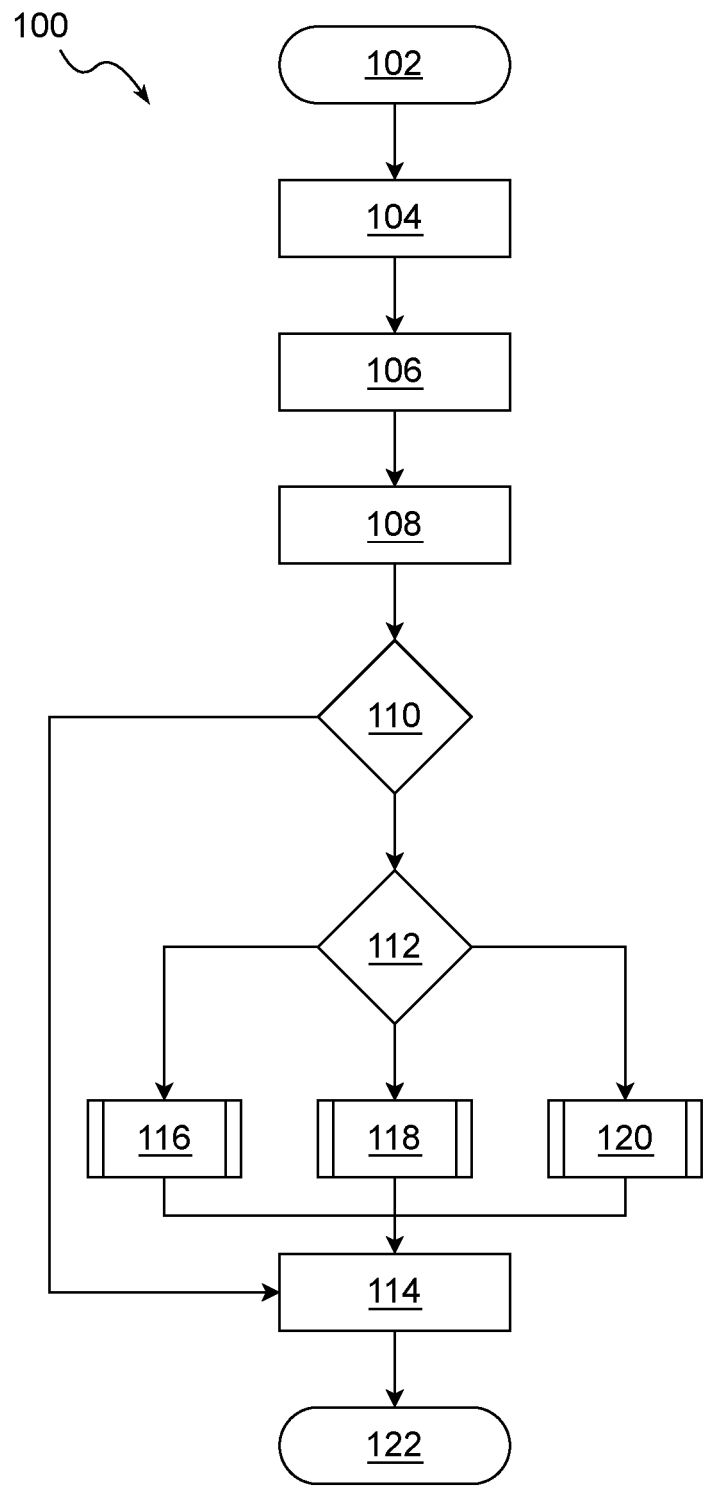
FIG. 3 is a flowchart of a method for motion planning for a vehicle according to an exemplary embodiment.

Referring to FIG. 3, the method 100 for motion planning for a vehicle begins at block 102 and proceeds to block 104. At block 104, a path determination algorithm is retrieved from the media 26 of the controller 14. In an exemplary embodiment, the path determination algorithm stored in the media 26 of the controller 14 may be periodically updated by an over-the-air (OTA) update procedure, using, for example, the vehicle communication system 20. A method 400 for training the path determination algorithm will be discussed in reference to FIG. 4. After block 104, the method 100 proceeds to block 106.

At block 106, the controller 14 performs a plurality of measurements of the remote vehicle 34 using the at least one vehicle sensor 16. In an exemplary embodiment, the plurality of measurements includes at least a plurality of position measurements of the remote vehicle 34 relative to the vehicle 12. Therefore, based on the plurality of measurements, the controller 14 may also compute a relative velocity, relative acceleration, heading, and location (using the GNSS 18) of the remote vehicle 34. After block 106, the method 100 proceeds to block 108.

At block 108, the controller 14 determines the risk score for each of the plurality of location cells 32 in the first exemplary driving environment 30a based at least in part on the plurality of measurements performed at block 106. In the scope of the present disclosure, the risk score of one of the plurality of location cells 32 quantifies a level of risk for the vehicle 12 to enter the one of the plurality of location cells 32. For example, referring again to FIG. 2, the remote vehicle 34 is increasing speed and changing location rapidly within the first exemplary driving environment 30a. Therefore, location cells in front of and adjacent to the remote vehicle 34 (e.g., the location cell 36d) are assigned a high risk score (e.g., a risk score of eighty-five). In an exemplary embodiment, the risk score for each of the plurality of location cells 32 is determined using a risk score machine learning model. In a non-limiting example, an input to the risk score machine learning model includes the plurality of measurements performed at block 106, and an output of the risk score machine learning model is a risk score for each of the plurality of location cells 32. In a non-limiting example, the risk score machine learning algorithm is trained by providing the algorithm with a plurality of measurements which have been pre-classified to correspond with hazardous driving behaviors. After sufficient training of the risk score machine learning algorithm, the algorithm can determine risk scores for the plurality of location cells 32. After block 108, the method 100 proceeds to block 110.

At block 110, the controller 14 classifies a behavior of the remote vehicle 34 based at least in part on the plurality of measurements performed at block 106. In an exemplary embodiment, a behavior class includes an intentional behavior class and an unintentional behavior class. In a non-limiting example, the intentional behavior class includes tailgating (i.e., following another vehicle at an unsafe distance), aggressive behavior (e.g., "road rage"), and wrong direction driving (i.e., driving in an incorrect direction on a one-way roadway or a controlled-access highway). The unintentional behavior class includes, for example, damage to the remote vehicle 34 (e.g., a non-functional brake indicator light) and distracted driving (e.g., using a cellphone while driving the remote vehicle 34). In an exemplary embodiment, the behavior of the remote vehicle 34 is classified using a plurality of behavior classification machine learning models (as discussed in U.S. application Ser. No. 18/055,116 filed Nov. 14, 2022, which matured into U.S. Publication No. 2024/0157935 the entire disclosure of which is hereby incorporated by reference herein). After block 110, if the behavior of the remote vehicle 34 is classified as intentional behavior, the method 100 proceeds to block 112 and a planned path of the vehicle 12 is adjusted using one of plurality of supervisory actions, as will be discussed below. If the behavior of the remote vehicle 34 is classified as unintentional behavior, the method 100 proceeds to block 114.

At block 112, the controller 14 determines a type of intentional behavior of the remote vehicle 34. In an exemplary embodiment, a behavior type includes a tailgating behavior type, a road rage behavior type, and a wrong direction behavior type. The tailgating behavior type includes following another vehicle at an unsafe distance. The road rage behavior type includes aggressive driving behavior, such as, for example, sudden braking or acceleration near another remote vehicle, cutting off another remote vehicle, and/or causing another remote vehicle to take evasive action to avoid a collision. The wrong direction behavior type includes driving in an incorrect direction on a one-way roadway, a controlled-access highway, or the like. It should be understood that further intentional behavior types are also included in the scope of the present disclosure. In an exemplary embodiment, the behavior type of the remote vehicle 34 is determined using a plurality of behavior classification machine learning models (as discussed in U.S. application Ser. No. 18/055,116 filed Nov. 14, 2022). After block 112, if the behavior type of the remote vehicle 34 is the tailgating behavior type, the method 100 proceeds to block 116. If the behavior type of the remote vehicle 34 is the road rage behavior type, the method 100 proceeds to block 118. If the behavior type of the remote vehicle 34 is the wrong direction behavior type, the method 100 proceeds to block 120.

At block 116, in response to determining that the behavior type of the remote vehicle 34 is the tailgating behavior type at block 112, the controller 14 executes a tailgating supervisory action. The tailgating supervisory action will be discussed in further detail below in reference to FIG. 5. After block 116, the method 100 proceeds to block 114.

At block 118, in response to determining that the behavior type of the remote vehicle 34 is the road rage behavior type at block 112, the controller 14 executes a road rage supervisory action. The road rage supervisory action will be discussed in further detail below in reference to FIG. 6. After block 118, the method 100 proceeds to block 114.

At block 120, in response to determining that the behavior type of the remote vehicle 34 is the wrong direction behavior type at block 112, the controller 14 executes a wrong direction supervisory action. The wrong direction supervisory action will be discussed in further detail below in reference to FIG. 7. the method 100 proceeds to block 114.

At block 114, the planned path of the vehicle 12 is adjusted using the path determination algorithm retrieved at block 104. In an exemplary embodiment, the path determination algorithm receives as input a location of the vehicle 12 (determined, for example, using the GNSS 18), a location of the remote vehicle 34 (determined, for example, using the plurality of measurements performed at block 106), and the risk score for each of the plurality of location cells 32 determined at block 108. In another exemplary embodiment, the path determination algorithm further receives as input a supervisory command provided by one of blocks 116, 118, and 120, and adjusts the planned path based on the supervisory command. Training of the path determination algorithm will be discussed in further detail below in reference to FIG. 4. After block 114, the method 100 proceeds to enter the standby state at block 122.

In an exemplary embodiment, the controller 14 repeatedly exits the standby state 122 and restarts the method 100 at block 102. In a non-limiting example, the controller 14 exits the standby state 122 and restarts the method 100 on a timer, for example, every three hundred milliseconds.

Figure 4:
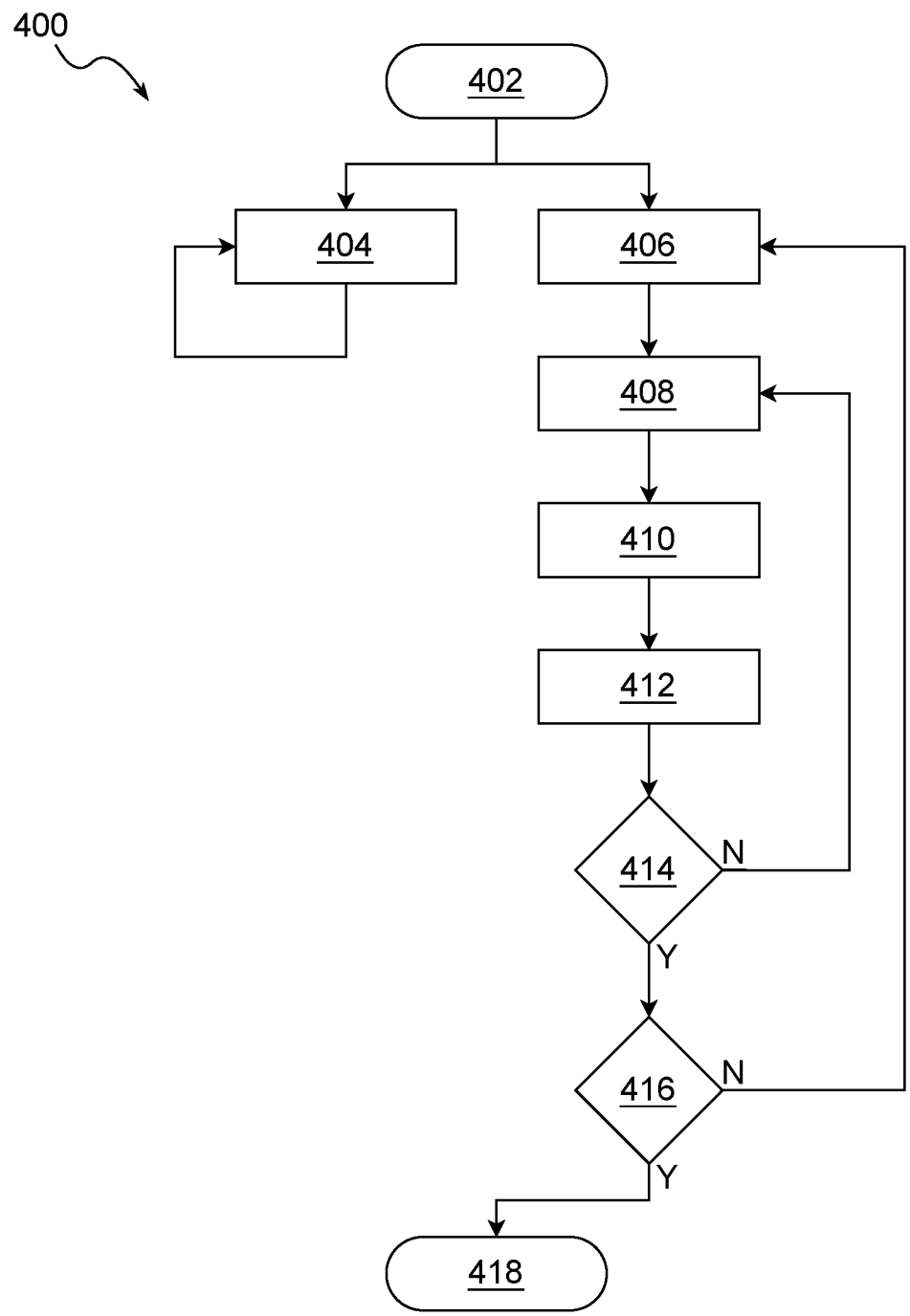
FIG. 4 is a flowchart of a method for training a path determination algorithm according to an exemplary embodiment.

Referring to FIG. 4, a flowchart of the method 400 for training the path determination algorithm is provided. It should be understood that to train the path determination algorithm, a computer system other than the vehicle 12 and the controller 14 may be used, including, for example, a server computer, a cloud-based server farm, or the like. Once the path determination algorithm has been trained, the path determination algorithm is transferred to the controller 14 of the vehicle 12 such that the path determination algorithm may be retrieved by the controller 14 of the vehicle 12 at block 104 of the method 100.

In the method 400, the path determination algorithm is a reinforcement learning (RL) algorithm. The RL algorithm provides an RL agent which may take actions in the environment. The RL algorithm takes into account a variety of factors such as road geometry (e.g., lane width, intersection configuration, and the like), traffic laws, and position of the simulated remote vehicle (i.e., an observation space of the RL algorithm). In the method 400, the RL algorithm is further trained to take the risk score for each of the plurality of location cells 32 into account. The set of possible actions which the vehicle 12 may take is known as the action space. The action space may include, for example, accelerating, decelerating, changing lanes, and the like. As will be discussed in further detail below, for each action taken, the RL agent receives an appropriate reward. Based on the observation space, the actions taken within the action space, and the computed rewards, the RL algorithm is trained to maximize the received reward. It should be understood that various additional training methods, such as, for example, supervised learning, semi-supervised learning, and unsupervised learning, are within the scope of the present disclosure. Furthermore, RL algorithms using a policy function instead of a machine learning model are also within the scope of the present disclosure.

The method 400 begins at block 402 and proceeds to blocks 404 and 406. At block 404, a simulated risk score (analogous to the risk score determined at block 108) is determined for each of the plurality of simulated location cells in the simulated environment using the risk score machine learning algorithm discussed in reference to block 108 above. As indicated by FIG. 4, block 404 is repeated constantly, such that the simulated risk score for each of the plurality of simulated location cells is constantly updated to account for motion of the simulated vehicle and/or the simulated remote vehicle.

At block 406, a unique simulated environment is generated. The simulated environment includes the simulated host vehicle (analogous to the vehicle 12), the simulated remote vehicle (analogous to the remote vehicle 34), and a plurality of simulated location cells (analogous to the plurality of location cells 32). In an exemplary embodiment, the simulated environment further includes a plurality of simulated remote vehicles, each of the plurality of simulated remote vehicles exhibiting differing driving behaviors. In an exemplary embodiment, a position of the simulated host vehicle relative to the simulated remote vehicle in the simulated environment is randomized, and a behavior of the simulated remote vehicle is also randomized. After block 406, the method 400 proceeds to block 408.

At block 408, the simulated host vehicle takes an action within the action space. In a non-limiting example, the action space includes accelerating, decelerating, changing lanes, and the like. In an exemplary embodiment, the action is determined by the RL algorithm based on the simulated risk score for each of the plurality of simulated location cells and the variety of additional factors such as road geometry (e.g., lane width, intersection configuration, and the like), traffic laws, and position of the simulated remote vehicle. After block 408, the method 400 proceeds to block 410.

At block 410, a total reward is calculated based on the action taken at block 408. In an exemplary embodiment, the reward includes a sum of a first reward proportional to a distance between the simulated host vehicle and the simulated remote vehicle and a second reward proportional to the simulated risk score of one of the simulated location cells entered by the simulated host vehicle. It should be understood that the total reward is also calculated based on other factors (e.g., time to finish maneuvers, number of collisions and/or near-collisions, smoothness of driving maneuvers, and the like) such that the path determination algorithm is trained to effectively navigate a variety of environments. For example, a large negative reward is provided if the action taken at block 408 results in the simulated host vehicle leaving the roadway. It should be understood that the first and second rewards are computed for the purpose of training the RL algorithm to handle vehicles exhibiting non-standard driving behaviors. Additional rewards may be included in the total reward for the purpose of training the RL algorithm to effectively navigate a variety of environments. After block 410, the method 400 proceeds to block 412.

At block 412, to train the RL algorithm, a decision-making function of the RL algorithm is updated based on the reward calculated at block 410. In an exemplary embodiment, parameters of the path determination algorithm (e.g., weights, biases, and/or the like) are modified based on the reward calculated at block 410 such that the RL algorithm learns to maximize the total reward. In an exemplary embodiment where the RL algorithm uses a policy function, an RL policy function is updated at block 412. After block 412, the method 400 proceeds to block 414.

At block 414, a predetermined simulation stopping point is evaluated. In an exemplary embodiment, the predetermined simulation stopping point is evaluated based on at least one of a plurality of factors, including, for example, an average total reward collected over time and a convergence of the RL agent. If the predetermined simulation stopping point is reached, the method 400 proceeds to block 416. If the predetermined simulation stopping point is not reached, the method 400 returns to block 408, such that a further action is taken, and the decision-making function of the RL algorithm is further updated.

At block 416, a predetermined training stopping point is evaluated. In an exemplary embodiment, the predetermined training stopping point is evaluated based on at least one of a plurality of factors, including, for example, a number of simulations performed, and a convergence of a total reward received during each simulation. If the predetermined training stopping point is reached, the method 400 proceeds to enter a standby state at block 418. If the predetermined simulation stopping point is not reached, the method 400 returns to block 404, such that a new, unique simulated environment is generated.

Figure 5:
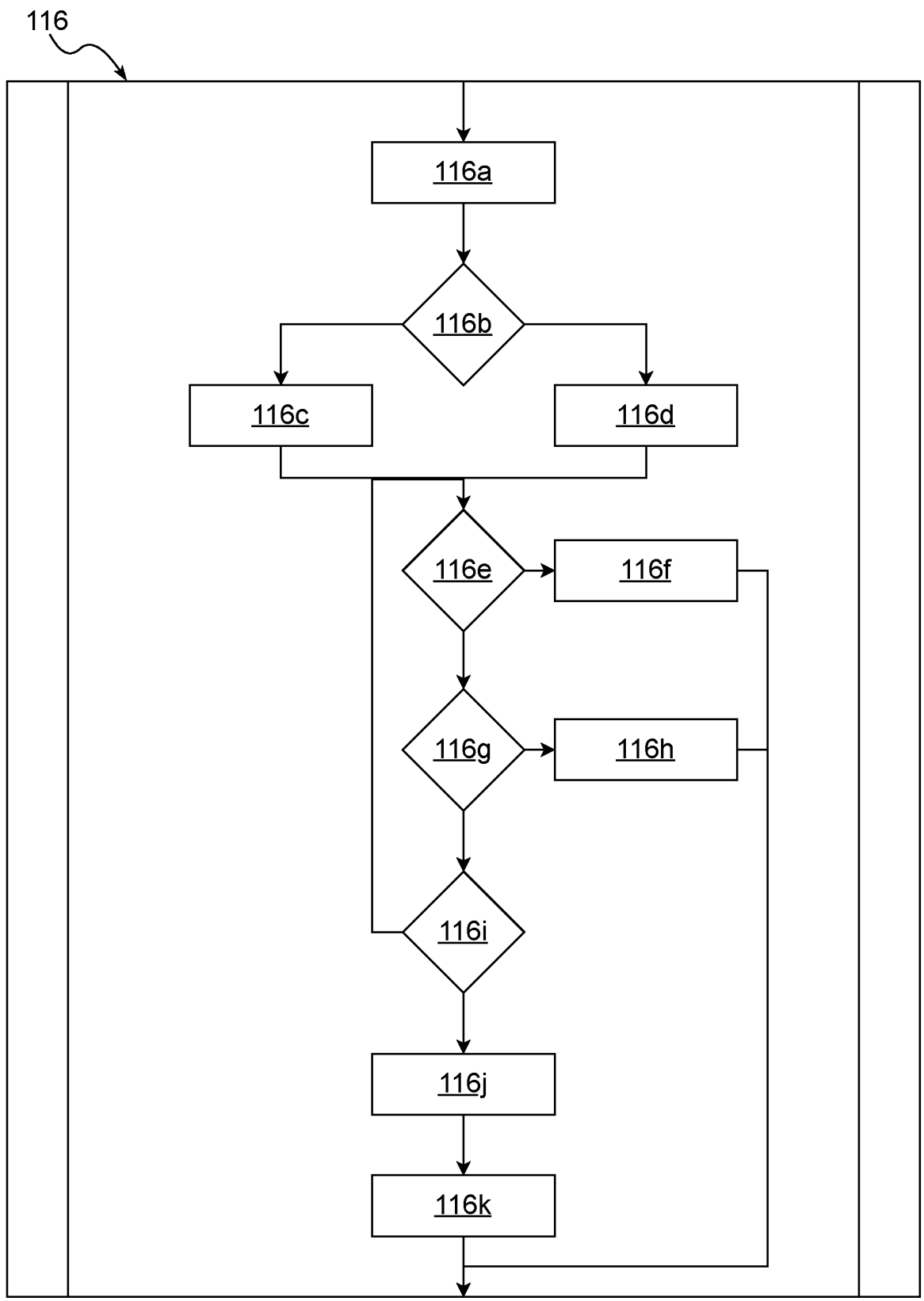
FIG. 5 is a flowchart of a tailgating supervisory action according to an exemplary embodiment.

Referring to FIG. 5, a flowchart of an exemplary embodiment of the block 116 discussed above is provided. The exemplary embodiment of block 116 is performed when a determination is made that the remote vehicle 34 is tailgating the vehicle 12. The exemplary embodiment of block 116 begins at block 116*a*. At block 116*a*, a maximum allowed speed of the roadway is determined based at least in part on a speed limit of the roadway. In an exemplary embodiment, the maximum allowed speed is determined based on a speed limit of the roadway retrieved using the GNSS 18 and based on weather, visibility, and/or surface conditions determined by communication with an external system using the vehicle communication system 20. After block 116*a*, the exemplary embodiment of block 116 proceeds to block 116*b*.

At block 116*b*, a speed of the vehicle 12 is compared to the maximum allowed speed determined at block 116*a*. If the speed of the vehicle is less than the maximum allowed speed, the exemplary embodiment of block 116 proceeds to block 116*c*. If the speed of the vehicle is greater than or equal to the maximum allowed speed, the exemplary embodiment of block 116 proceeds to block 116*d*.

At block 116*c*, the speed of the vehicle is increased to the maximum allowed speed. After block 116, the exemplary embodiment of block 116 proceeds to block 116*e*.

At block 116*d*, the speed of the vehicle is maintained at the maximum allowed speed. After block 116, the exemplary embodiment of block 116 proceeds to block 116*e*.

At block 116*e*, the controller 14 identifies a state of a right adjacent lane of travel. In an exemplary embodiment, the right adjacent lane of travel is a lane on the roadway adjacent to a right side of the vehicle 12 where the vehicle 12 may legally travel if no other vehicles are occupying the right adjacent lane of travel adjacent to the vehicle 12. In an exemplary embodiment the controller 14 identifies the state of the right adjacent lane of travel using the at least one vehicle sensor 16. The state of the right adjacent lane of travel includes either an unoccupied state (i.e., no other vehicle is occupying an area in the right adjacent lane adjacent to the vehicle 12) or an occupied state (i.e., another vehicle is occupying the area in the right adjacent lane adjacent to the vehicle 12). If the state of the right adjacent lane of travel is unoccupied, the exemplary embodiment of block 116 proceeds to block 116*f*. If the state of the right adjacent lane of travel is occupied, the exemplary embodiment of block 116 proceeds to block 116*g*.

At block 116*f*, the controller 14 commands the vehicle 12 to move into the right adjacent lane of travel such that the vehicle 12 is no longer directly in front of the remote vehicle 34. After block 116*f*, the exemplary embodiment of block 116 is concluded and the method 100 continues.

At block 116*g*, the controller 14 identifies a state of a left adjacent lane of travel. In an exemplary embodiment, the left adjacent lane of travel is a lane on the roadway adjacent to a left side of the vehicle 12 where the vehicle 12 may legally travel if no other vehicles are occupying the left adjacent lane of travel adjacent to the vehicle 12. In an exemplary embodiment the controller 14 identifies the state of the left adjacent lane of travel using the at least one vehicle sensor 16. The state of the left adjacent lane of travel includes either an unoccupied state (i.e., no other vehicle is occupying an area in the left adjacent lane adjacent to the vehicle 12) or an occupied state (i.e., another vehicle is occupying the area in the left adjacent lane adjacent to the vehicle 12). If the state of the left adjacent lane of travel is unoccupied, the exemplary embodiment of block 116 proceeds to block 116*h*. If the state of the left adjacent lane of travel is occupied, the exemplary embodiment of block 116 proceeds to block 116*i*.

At block 116*h*, the controller 14 commands the vehicle 12 to move into the left adjacent lane of travel such that the vehicle 12 is no longer directly in front of the remote vehicle 34. After block 116*h*, the exemplary embodiment of block 116 is concluded and the method 100 continues.

At block 116*i*, the controller 14 determines a chase time of the remote vehicle 34. In the scope of the present disclosure, the chase time is an amount of time which the remote vehicle 34 has been tailgating (i.e., following closely) the vehicle 12. In an exemplary embodiment, the chase time is determined using the at least one vehicle sensor 16 to detect and track the remote vehicle 34. If the chase time is greater than or equal to a predetermined chase time threshold (e.g., five minutes), the exemplary embodiment of block 116 proceeds to block 116*j*. If the chase time is less than the predetermined chase time threshold, the exemplary embodiment of block 116 returns to block 116*e*.

At block 116*j*, the controller 14 notifies the occupant of the vehicle 12 of the tailgating remote vehicle 34 using the display 22. In an exemplary embodiment, the occupant of the vehicle 12 is notified with safety advice, such as, for example, to avoid eye contact with an occupant of the remote vehicle 34, such that the occupant of the remote vehicle 34 is not provoked to further action. After block 116*j*, the exemplary embodiment of block 116 proceeds to block 116*k*.

At block 116*k*, the vehicle 12 pulls over to a shoulder of the roadway. In an exemplary embodiment, the controller 14 additionally uses the vehicle communication system 20 to transmit a report of the tailgating behavior of the remote vehicle 34 to other vehicles and/or infrastructure. In another exemplary embodiment, the controller 14 uses the vehicle communication system 20 to submit a report identifying the remote vehicle 34 to a public safety authority (e.g., a police department). After block 116*k*, the exemplary embodiment of block 116 is concluded and the method 100 continues.

Figure 6:
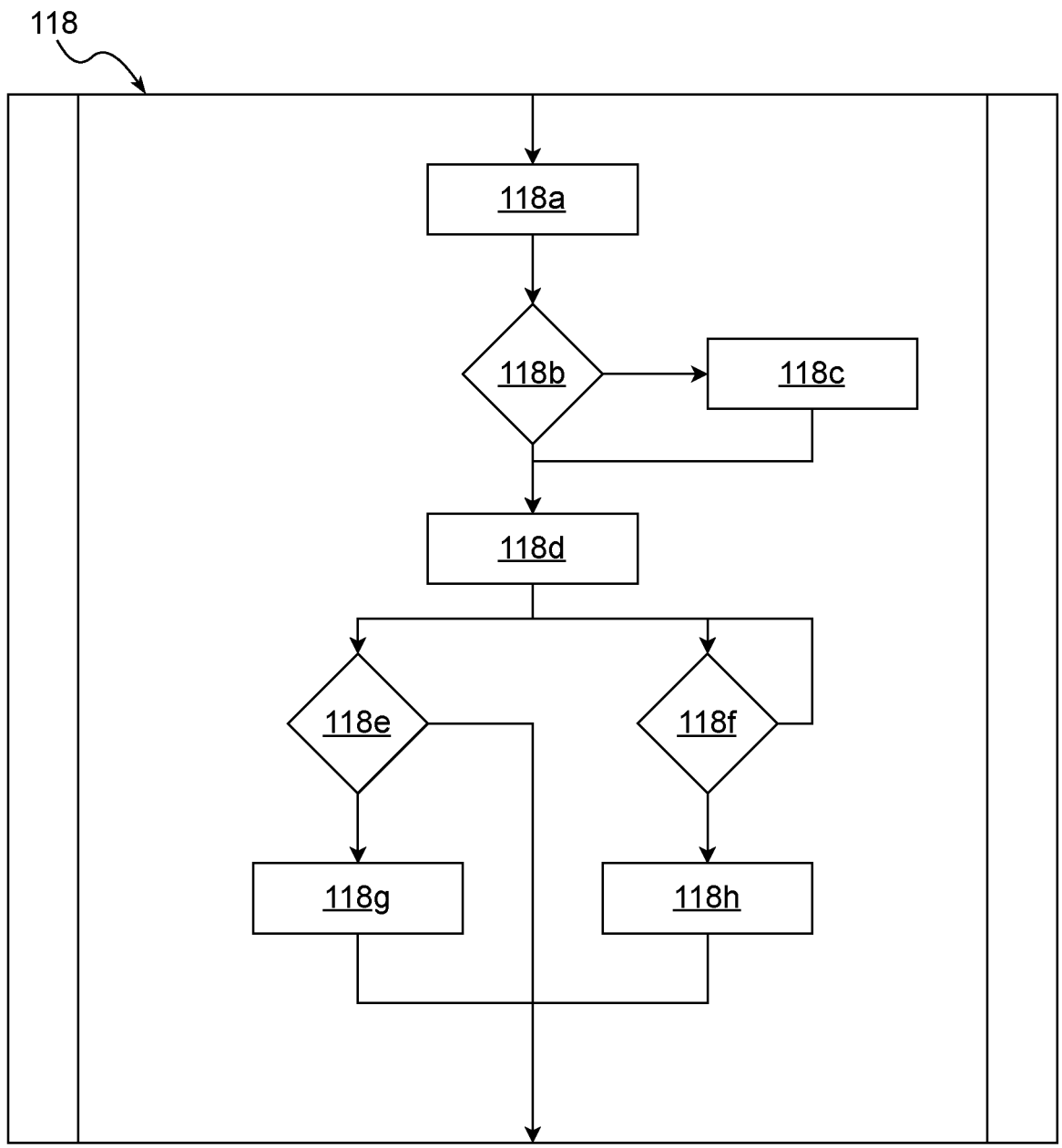
FIG. 6 is a flowchart of a road rage supervisory action according to an exemplary embodiment.

Referring to FIG. 6, a flowchart of an exemplary embodiment of the block 118 discussed above is provided. The exemplary embodiment of block 118 is performed when a determination is made that the remote vehicle 34 is exhibiting road rage behavior toward the vehicle 12. The exemplary embodiment of block 118 begins at block 118*a*. At block 118*a*, the controller 14 notifies the occupant of the vehicle 12 of the road rage behavior of the remote vehicle 34 using the display 22. In an exemplary embodiment, the occupant of the vehicle 12 is notified to avoid eye contact and obscene gestures with an occupant of the remote vehicle 34, such that the occupant of the remote vehicle 34 is not provoked to further action. After block 118*a*, the exemplary embodiment of block 118 proceeds to block 118*b*.

At block 118*b*, a lane state of the remote vehicle 34 is determined. In the scope of the present disclosure, the lane state of the remote vehicle 34 identifies whether the remote vehicle 34 is traveling in a same lane of the roadway relative to the vehicle 12 (i.e., a same lane state) or whether the remote vehicle 34 is traveling in an adjacent lane of the roadway relative to the vehicle 12 (i.e., an adjacent lane state). In an exemplary embodiment, the lane state is determined using the at least one vehicle sensor 16 to track a position of the remote vehicle 34 relative to the vehicle 12. If the lane state is the same lane state, the exemplary embodiment of block 118 proceeds to block 118*c*. If the lane state is the adjacent lane state, the exemplary embodiment of block 118 proceeds to block 118*d*.

At block 118*c*, the controller 14 commands the vehicle 12 to move into an adjacent lane of travel such that the vehicle 12 is no longer directly in front of the remote vehicle 34. After block 118*c*, the exemplary embodiment of block 118 proceeds to block 118*d*.

At block 118*d*, the controller 14 commands the vehicle 12 to reduce the speed of the vehicle 12, such that the remote vehicle 34 may pass the vehicle 12. In an exemplary embodiment, the speed of the vehicle 12 is decreased by ten miles per hour. After block 118*d*, the exemplary embodiment of block 118 proceeds to blocks 118*e* and 118*f*.

At block 118*e*, the controller 14 identifies whether the remote vehicle 34 has passed the vehicle 12. In an exemplary embodiment, to identify whether the remote vehicle 34 has passed the vehicle 12, the controller 14 identifies a relative location of the vehicle 12 to the remote vehicle 34. The relative location may be a leading relative location (i.e., the vehicle 12 is in front of the remote vehicle 34) or a following relative location (i.e., the vehicle 12 is behind the remote vehicle 34). In an exemplary embodiment, the relative location is identified using the at least one vehicle sensor 16. If the relative location of the vehicle 12 is the following relative location, the exemplary embodiment of block 118 is concluded and the method 100 continues. If the relative location of the vehicle 12 is the leading relative location (i.e., the remote vehicle 34 has refused to pass the vehicle 12), the exemplary embodiment of block 118 proceeds to block 118*g*.

At block 118*g*, the controller 14 executes a first evasive action. In an exemplary embodiment, the first evasive action includes commands to lock all doors of the vehicle 12 and close all windows of the vehicle 12. In another exemplary embodiment, the first evasive action includes commands to execute instructions to contact the public safety authority (e.g., the police department) and change a navigation destination of the vehicle 12 to a public location (e.g., a public parking lot, a police station, or the like). In another exemplary embodiment, the first evasive action further includes commands to stop the vehicle 12 at the public location. After block 118*g*, the exemplary embodiment of block 118 is concluded and the method 100 continues.

At block 118*f*, the controller 14 determines whether the occupant of the remote vehicle 34 has exited the remote vehicle 34. In an exemplary embodiment, the controller 14 uses the at least one vehicle sensor 16 to determine whether the occupant of the remote vehicle 34 has exited the remote vehicle 34. If the occupant of the remote vehicle 34 has exited the remote vehicle 34, the exemplary embodiment of block 118 proceeds to block 118*h*. If the occupant of the remote vehicle 34 has not exited the remote vehicle 34, the exemplary embodiment of block 118 returns to blocks 118*e* and 118*f*.

At block 118*h*, the controller 14 executes a second evasive action. In an exemplary embodiment, the second evasive action includes commands to activate a horn of the vehicle 12 repeatedly and collect identifying information about the occupant of the remote vehicle 34 using the at least one vehicle sensor 16. In a non-limiting example where the at least one vehicle sensor 16 includes a camera, the camera is used to record photos and/or videos of the occupant of the remote vehicle 34 and/or the remote vehicle 34. After block 118*h*, the exemplary embodiment of block 118 is concluded and the method 100 continues.

Figure 7:
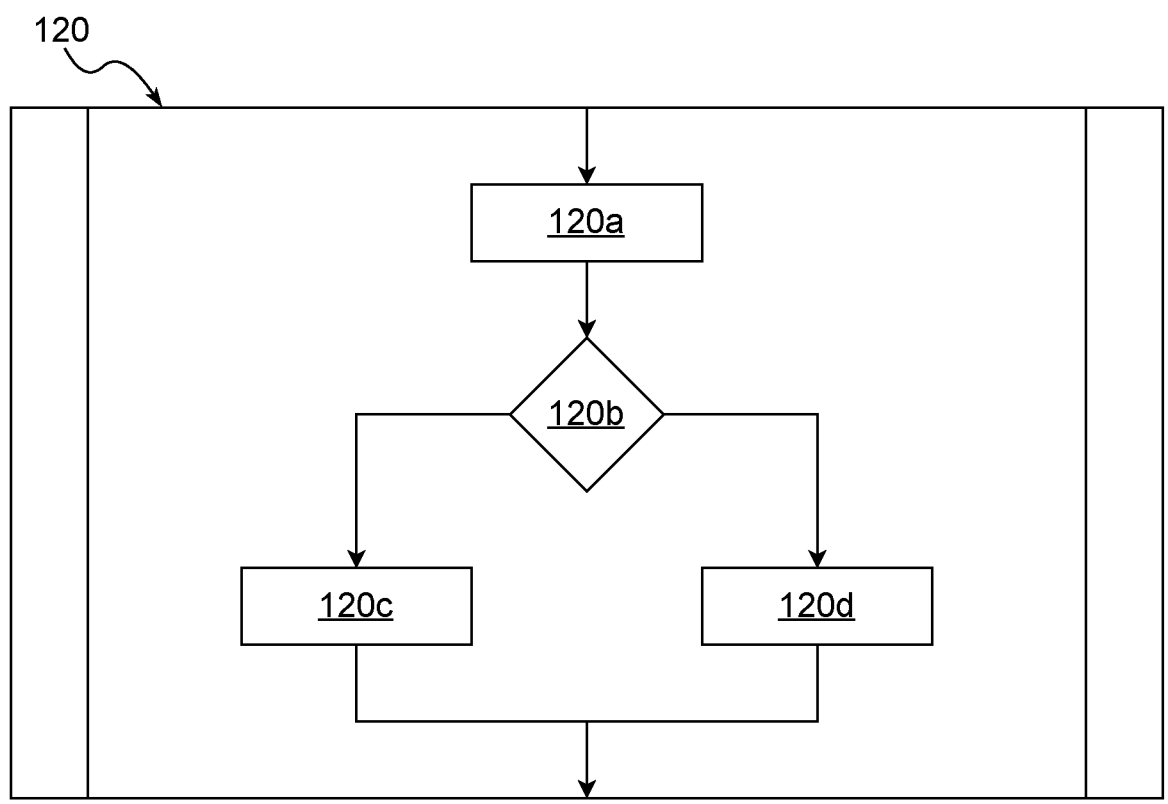
FIG. 7 is a flowchart of a wrong direction supervisory action according to an exemplary embodiment.

Referring to FIG. 7, a flowchart of an exemplary embodiment of the block 120 discussed above is provided. The exemplary embodiment of block 118 is performed when a determination is made that the remote vehicle 34 is traveling in a wrong direction. The exemplary embodiment of block 120 begins at block 120*a*. At block 120*a*, a predicted path of the remote vehicle 34 is identified. In an exemplary embodiment, if the remote vehicle 34 is not detected by the at least one vehicle sensor 16, the controller 14 uses the vehicle communication system 20 to communicate with the remote vehicle 34 and determine a location, speed, and heading of the remote vehicle 34 to identify the predicted path of the remote vehicle 34. In a non-limiting example, the location, speed, and heading of the remote vehicle 34 are transmitted by the remote vehicle 34 to the vehicle communication system 20. In another non-limiting example, the vehicle communication system 20 is used to communicate with infrastructure (e.g., an electronic road sign). The infrastructure provides information about the remote vehicle 34 used by the controller 14 to determine the predicted path of the remote vehicle 34. In yet another non-limiting example, the at least one vehicle sensor 16 is used to capture an image of an electronic road sign displaying a warning message and use an optical character recognition algorithm to retrieve information about the predicted path of the remote vehicle 34 based on the image of the electronic road sign. In another exemplary embodiment, if the remote vehicle 34 is detected by the at least one vehicle sensor 16, the controller 14 uses the at least one vehicle sensor 16 to identify the location, speed, and heading of the remote vehicle 34 to identify the predicted path of the remote vehicle 34. After block 120a, the exemplary embodiment of block 120 proceeds to block 120b.

At block 120b, the predicted path of the remote vehicle 34 is classified as either a collision path or a non-collision path. In an exemplary embodiment, the predicted path is classified based on a location of the vehicle 12 (determined using the GNSS 18) and the predicted path determined at block 120a. If the predicted path of the remote vehicle 34 is classified as the collision path, the exemplary embodiment of block 120 proceeds to block 120c. If the predicted path of the remote vehicle 34 is classified as the non-collision path, the exemplary embodiment of block 120 proceeds to block 120d.

At block 120c, the controller 14 commands the vehicle 12 to move into a shoulder of the roadway to avoid a collision with the remote vehicle 34. In an exemplary embodiment, the controller 14 additionally limits a braking ability of the vehicle 12, such that the vehicle 12 may quickly move out of a collision path with the remote vehicle 34. After block 120c, the exemplary embodiment of block 120 is concluded and the method 100 continues.

At block 120d, the controller 14 takes a third evasive action. In an exemplary embodiment, the third evasive action includes commands to activate the horn of the vehicle 12 repeatedly, flash indicator lights of the vehicle 12 repeatedly, increase a following distance between the vehicle 12 and any other vehicles on the roadway, reduce a speed of the vehicle 12, change a navigation destination of the vehicle 12 to exit the roadway, communicate information about the remote vehicle 34 to other vehicles using the vehicle communication system 20, and communicate identifying information about the remote vehicle 34 to a public safety authority (e.g., police) using the vehicle communication system 20. After block 120d, the exemplary embodiment of block 120 is concluded and the method 100 continues.

Referring to FIGS. 8a and 8b, a second exemplary driving environment 30b and a third exemplary driving environment 30c are shown to further illustrate the operation of the system 10 and method 100. Referring to FIG. 8a, the second exemplary driving environment 30b is shown. In the second exemplary driving environment 30b, the remote vehicle 34 reduces speed often and drifts towards a left side of second exemplary driving environment 30b (e.g., a roadway) often. Therefore, the path determination machine learning algorithm may decide to overtake the remote vehicle 34. Referring to FIG. 8b, the third exemplary driving environment 30c is shown. In the third exemplary driving environment 30c, the remote vehicle 34 is driving at a high rate of speed. Therefore, the path determination machine learning algorithm may decide to remain in an adjacent lane relative to the remote vehicle 34, allowing the remote vehicle 34 to pass.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for motion planning for a vehicle, the system comprising:
at least one vehicle sensor for determining information about an environment surrounding the vehicle; and
a controller in electrical communication with the at least one vehicle sensor, wherein the controller is programmed to:
perform a plurality of measurements of a remote vehicle using the at least one vehicle sensor, wherein the plurality of measurements includes at least a plurality of position measurements of the remote vehicle relative to the vehicle;
determine a risk score for each of a plurality of location cells in an environment surrounding the remote vehicle based at least in part on the plurality of measurements of the remote vehicle; and
adjust a planned path of the vehicle based at least in part on the risk score of each of the plurality of location cells in the environment surrounding the remote vehicle, wherein to adjust the planned path of the vehicle, the controller is further programmed to:
determine a behavior class of the remote vehicle based at least in part on the plurality of measurements of the remote vehicle, wherein the behavior class includes an intentional behavior class and an unintentional behavior class; and
adjust the planned path of the vehicle using a path determination algorithm based at least in part on the behavior class, wherein to adjust the planned path of the vehicle, the controller is further programmed to:
determine a behavior type of the remote vehicle in response to determining that the behavior class of the remote vehicle is the intentional behavior class, wherein the behavior type includes at least one of a tailgating behavior type, a road rage behavior type, and a wrong direction behavior type;
execute a tailgating supervisory action to adjust the planned path of the vehicle in response to determining that the behavior type of the remote vehicle is the tailgating behavior type;
execute a road rage supervisory action to adjust the planned path of the vehicle in response to determining that the behavior type of the remote vehicle is the road rage behavior type; and
execute a wrong direction supervisory action to adjust the planned path of the vehicle in response to determining that the behavior type of the remote vehicle is the wrong direction behavior type.

2. The system of claim 1, wherein to determine the risk score for each of the plurality of location cells in the environment surrounding the remote vehicle, the controller is further programmed to:

determine the risk score for each of the plurality of location cells using a risk score machine learning model, wherein an input for the risk score machine learning model includes the plurality of measurements of the remote vehicle, and wherein an output of the risk score machine learning model is the risk score for each of the plurality of location cells.

3. The system of claim 1, wherein to execute the tailgating supervisory action, the controller is further programmed to:
determine a maximum allowed speed based at least in part on a speed limit of a roadway upon which the vehicle is traveling;
compare a speed of the vehicle to the maximum allowed speed;
increase the speed of the vehicle in response to determining that the speed of the vehicle is less than the maximum allowed speed;
maintain the speed of the vehicle in response to determining that the speed of the vehicle is greater than or equal to the maximum allowed speed;
identify a state of a right adjacent lane of travel, wherein the state of the right adjacent lane of travel includes an occupied state and an unoccupied state;
move the vehicle into the right adjacent lane of travel in response to determining that the state of the right adjacent lane of travel is the unoccupied state;
identify a state of a left adjacent lane of travel, wherein the state of the left adjacent lane of travel includes an occupied state and an unoccupied state;
move the vehicle into the left adjacent lane of travel in response to determining that the state of the left adjacent lane of travel is the unoccupied state;
determine a chase time in response to determining that the state of the right adjacent lane of travel is the occupied state and the state of the left adjacent lane of travel is the occupied state;
compare the chase time to a predetermined chase time threshold;
notify an occupant of the vehicle and move the vehicle into a shoulder of the roadway in response to determining that the chase time is greater than or equal to the predetermined chase time threshold; and
transmit information to a remote vehicle using a vehicle communication system in response to determining that the chase time is greater than or equal to the predetermined chase time threshold.

4. The system of claim 1, wherein to execute the road rage supervisory action, the controller is further programmed to:
notify an occupant of the vehicle;
determine a lane state of the remote vehicle, wherein the lane state includes a same lane state and an adjacent lane state;
move the vehicle into an adjacent lane in response to determining that the lane state of the remote vehicle is the same lane state;
decrease a speed of the vehicle in response to determining that the lane state of the remote vehicle is the adjacent lane state;
identify a relative location of the vehicle to the remote vehicle, wherein the relative location of the vehicle includes a leading relative location and a following relative location;
take a first evasive action in response to determining that the relative location of the vehicle is the leading relative location; and
take a second evasive action in response to determining that an occupant of the remote vehicle has exited the remote vehicle.

5. The system of claim 1, wherein to execute the wrong direction supervisory action, the controller is further programmed to:
detect the remote vehicle using a vehicle communication system;
adjust the planned path of the vehicle to exit a roadway upon which the remote vehicle is traveling in response to detecting the remote vehicle using the vehicle communication system;
detect the remote vehicle using the at least one vehicle sensor;
identify a predicted path of the remote vehicle in response to detecting the remote vehicle using the at least one vehicle sensor, wherein the predicted path includes a collision path and a non-collision path;
move the vehicle to a shoulder of a roadway upon which the vehicle is traveling in response to determining that the predicted path of the remote vehicle is the collision path; and
take a third evasive action in response to determining that the predicted path of the remote vehicle is the non-collision path.

6. The system of claim 1, wherein the path determination algorithm is configured to adjust the planned path of the vehicle to minimize the risk score of each of the plurality of location cells entered by the vehicle and maximize a distance between the vehicle and the remote vehicle.

7. The system of claim 6, wherein the path determination algorithm is a reinforcement learning algorithm, and wherein the reinforcement learning algorithm is trained based at least in part on a distance between the vehicle and the remote vehicle.

8. The system of claim 7, wherein the reinforcement learning algorithm is trained using a simulated environment, wherein the simulated environment includes a simulated host vehicle and a simulated remote vehicle, wherein the simulated environment further includes a plurality of simulated location cells, each of the plurality of simulated location cells having a simulated risk score, wherein the reinforcement learning algorithm receives a first reward proportional to the distance between the simulated host vehicle and the simulated remote vehicle and a second reward proportional to the simulated risk score of each of the plurality of simulated location cells entered by the simulated host vehicle, wherein the reinforcement learning algorithm is configured to maximize a total reward.

9. A method for motion planning for a vehicle, the method comprising:
performing a plurality of measurements of a remote vehicle using at least one vehicle sensor, wherein the plurality of measurements includes at least a plurality of position measurements of the remote vehicle;
determining a risk score for each of a plurality of location cells in an environment surrounding the remote vehicle based at least in part on the plurality of measurements of the remote vehicle; and
adjusting a planned path of the vehicle based at least in part on the risk score of each of the plurality of location cells in the environment surrounding the remote vehicle, wherein adjusting a planned path of the vehicle further comprises:
determining a behavior class of the remote vehicle based at least in part on the plurality of measurements of the remote vehicle, wherein the behavior class includes an intentional behavior class and an unintentional behavior class; and adjusting the planned path of the vehicle using a path determination algorithm based at least in part on the behavior class of the remote vehicle, wherein adjusting a planned path of the vehicle further comprises:

determining a behavior type of the remote vehicle in response to determining that the behavior class of the remote vehicle is the intentional behavior class, wherein the behavior type includes a tailgating behavior type, a road rage behavior type, and a wrong direction behavior type;

executing a tailgating supervisory action to adjust the planned path of the vehicle in response to determining that the behavior type of the remote vehicle is the tailgating behavior type;

executing a road rage supervisory action to adjust the planned path of the vehicle in response to determining that the behavior type of the remote vehicle is the road rage behavior type; and executing a wrong direction supervisory action to adjust the planned path of the vehicle in response to determining that the behavior type of the remote vehicle is the wrong direction behavior type.

10. The method of claim 9, wherein determining the risk score for each of the plurality of location cells in the environment surrounding the remote vehicle further comprises:

determining the risk score for each of the plurality of location cells using a risk score machine learning model, wherein an input for the risk score machine learning model includes the plurality of measurements of the remote vehicle, and wherein an output of the risk score machine learning model is the risk score for each of the plurality of location cells.

11. The method of claim 9, wherein the path determination algorithm is a reinforcement learning algorithm, the method further comprising training the reinforcement learning algorithm, wherein training the reinforcement learning algorithm further comprises:

training the reinforcement learning algorithm to adjust the planned path of the vehicle to minimize the risk score of each of the plurality of location cells entered by the vehicle and maximize a distance between the vehicle and the remote vehicle.

12. The method of claim 11, wherein the reinforcement learning algorithm receives rewards based at least in part on a distance between the vehicle and the remote vehicle.

13. The method of claim 12, wherein training the reinforcement learning algorithm further comprises:

generating a plurality of simulated environments, wherein each of the plurality of simulated environments includes a simulated host vehicle, a simulated remote vehicle, and a plurality of simulated location cells;

determining a simulated risk score for each of the plurality of simulated location cells of each of the plurality of simulated environments; and training the reinforcement learning algorithm using the plurality of simulated environments, wherein the reinforcement learning algorithm receives a first reward proportional to the distance between the simulated host vehicle and the simulated remote vehicle and a second reward proportional to the simulated risk score of each of the plurality of simulated location cells entered by the simulated host vehicle, wherein the reinforcement learning algorithm is configured to maximize a total reward.

14. A system for motion planning for a vehicle, the system comprising:

at least one vehicle sensor for determining information about an environment surrounding the vehicle;

a global navigation satellite system (GNSS) for determining a geographical location, heading, and orientation of the vehicle; and a controller in electrical communication with the at least one vehicle sensor and the GNSS, wherein the controller is programmed to:

perform a plurality of measurements of a remote vehicle using the at least one vehicle sensor, wherein the plurality of measurements includes at least a plurality of position measurements of the remote vehicle;

determine a risk score for each of a plurality of location cells in an environment surrounding the vehicle using a risk score machine learning model, wherein an input for the risk score machine learning model includes the plurality of measurements of the remote vehicle, and wherein an output of the risk score machine learning model is the risk score for each of the plurality of location cells;

determine a behavior class of the remote vehicle based at least in part on the plurality of measurements of the remote vehicle, wherein the behavior class includes an intentional behavior class and an unintentional behavior class; and adjust a planned path of the vehicle using a path determination algorithm in response to determining that the behavior class is the unintentional behavior class, wherein to adjust the planned path of the vehicle, the controller is further programmed to:

determine a behavior type of the remote vehicle in response to determining that the behavior class of the remote vehicle is the intentional behavior class, wherein the behavior type includes a tailgating behavior type, a road rage behavior type, and a wrong direction behavior type;

execute a tailgating supervisory action to adjust the planned path of the vehicle in response to determining that the behavior type of the remote vehicle is the tailgating behavior type;

execute a road rage supervisory action to adjust the planned path of the vehicle in response to determining that the behavior type of the remote vehicle is the road rage behavior type; and execute a wrong direction supervisory action to adjust the planned path of the vehicle in response to determining that the behavior type of the remote vehicle is the wrong direction behavior type.

15. The system of claim 14, wherein the path determination algorithm is a reinforcement learning algorithm trained using a simulated environment, wherein the simulated environment includes a simulated host vehicle and a simulated remote vehicle, wherein the simulated environment further includes a plurality of simulated location cells, each of the plurality of simulated location cells having a simulated risk score, wherein the reinforcement learning algorithm receives a first reward proportional to a distance between the simulated host vehicle and the simulated remote vehicle and a second reward proportional to the simulated risk score of each of the plurality of simulated location cells entered by the simulated host vehicle, wherein the reinforcement learning algorithm is configured to maximize a total reward.

* * * * *